United States Patent Office 3,544,572
Patented Dec. 1, 1970

3,544,572
THIONOPHOSPHONIC ACID ESTERS
Christa Fest, Wuppertal-Elberfeld, and Ingeborg Hammann, Cologne, Germany, assignors to Farbenfabriken Bayer Aktiengesellschaft, Leverkusen, Germany, a corporation of Germany
No Drawing. Filed Feb. 19, 1969, Ser. No. 800,697
Claims priority, application Germany, Mar. 27, 1968, 1,770,067
Int. Cl. C07d 51/04
U.S. Cl. 260—250                    9 Claims

ABSTRACT OF THE DISCLOSURE

Thionophosphonic acid esters, i.e. (alkyl and phenyl)-O-alkyl-O-(1,2 - pyridazin-6-on-3-yl) - thionophosphonic acid esters, which possess arthropodicidal, especially acaricidal and insecticidal, properties as well as rodenticidal and plant growth-inhibiting properties, and which may be produced by reacting the corresponding thionophosphonic acid diester monohalide with maleic acid hydrazide.

The present invention relates to and has for its objects the provision for particular new thionophosphonic acid esters, i.e. (alkyl and phenyl)-O-alkyl-O-(1,2-pyridazin-6-on-3-yl)-thionophosphonic acid esters, which possess arthropodicidal, especially insecticidal and acaricidal, properties, as well as rodenticidal and plant growth-inhibiting properties, active compositions in the form of mixtures of such compounds which solid and liquid dispersible carrier vehicles, and methods for producing such compounds and for using such compounds in a new way especially for combating pests, e.g. arthropods and rodents, and for inhibiting plant growth, with other and further objects becoming apparent from a study of the within specification and accompanying examples.

In German Published Patents (DAS) 1,018,870 and 1,018,871 there are described certain O,O - dialkyl - O - [pyridazinyl-(3)]- or -O-[pyridazinone-(6)-yl-(3)]-phosphoric or -thionophosphoric acid esters. These compounds can be prepared by reaction of equimolar amounts of the appropriate O,O - dialkyl-(thiono)phosphoric acid ester chlorides and maleic acid hydrazide.

It has been found in accordance with the present invention that the particular new O-(1,2-pyridazin-6-on-3-yl)-thionophosphonic acid esters of the formula

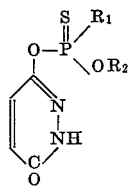

in which
  $R_1$ is alkyl of 1–6 carbon atoms or phenyl, and
  $R_2$ is alkyl of 1–6 carbon atoms,
  $R_1$ and $R_2$ being the same or different when both are alkyl, exhibit strong arthropodicidal, especially insecticidal and acaricidal, as well as rodenticidal and plant growth-inhibiting properties.

The present invention also provides a process for the production of compounds of Formula I above in which a thionophosphonic acid ester halide of the general formula:

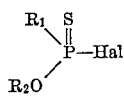

in which $R_1$ and $R_2$ are the same as defined above, and Hal is a halogen atom such as chloro, is reacted with maleic acid hydrazide (III) in the presence of an acid-binding agent.

Advantageously, the particular new compounds of Formula I above are distinguished by outstanding insecticidal and acaricidal properties as well as, in most cases, extremely low toxicity to warm-blooded animals and concomitantly low phytotoxicity. The instant compounds possess a very strong activity against both eating and sucking insects, and are in this respect clearly superior to the above-mentioned comparable known compounds of analogous constitution and the same type of activity. Furthermore, the instant compounds exhibit a good rodenticidal secondary activity and even act as plant growth inhibitors when used in higher concentrations. The new compounds of the present invention therefore represent a genuine enrichment of the art.

The course of the production process according to the present invention is illustrated by the following reaction scheme:

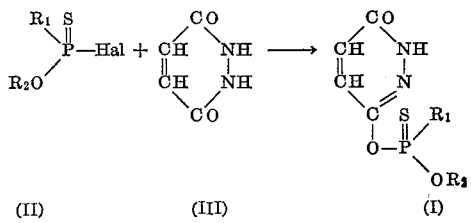

in which the symbols $R_1$, $R_2$ and Hal are the same as defined above.

Advantageously, in accordance with the present invention, in the various formulae herein:

$R_1$ represents straight and branched chain lower alkyl hydrocarbon of 1–6 carbon atoms such as methyl ethyl, n- and iso-propyl, n-, iso-, sec.- and tert.-butyl, amyl, hexyl, and the like, especially alkyl of 1–4 or 1–3, and more especially 1–2, carbon atoms; or phenyl;

$R_2$ represents straight and branched chain lower alkyl hydrocarbon of 1–6 carbon atoms such as methyl to hexyl inclusive as defined above, and the like, and especially alkyl of 1–4 or 1–3, and more especially 1–2, carbon atoms;

$R_1$ and $R_2$ being the same or different when both are lower alkyl.

The said O-alkyl-thiono-phosphonic acid diester halides (II) and maleic acid hydrazide (III) required as starting materials for the production process of the present invention are known from the literature and are readily available on an industrial scale.

In carrying out the production reaction according to the present invention, the free maleic acid hydrazide (III) is used and the reaction is caused to proceed in the presence of an acid-binding agent.

For this purpose, practically all customary acid-binding agents, i.e. acid acceptors, can be used. There have proved particularly suitable, however, alkali metal alcoholates and carbonates, such as sodium or potassium methylate, ethylate and carbonate, and tertiary aliphatic, aromatic and heterocyclic amines, for example triethylamine, dimethylaniline, dimethylbenzylamine and pyridine; and the like.

The reaction according to the present invention is preferably carried out in the presence of a solvent (this term includes a mere diluent).

Practically all inert organic solvents or mixtures thereof are suitable, such as hydrocarbons, for example benzine, benzene, toluene, chlorobenzene and xylene; ethers, for example diethyl ether, dibutyl ether and dioxen; ketones, for example acetone, methylethyl ketone, methylisopropyl ketone and methylisobutyl ketone; and the like. Particularly good results have been obtained with low-boiling aliphatic alcohols, for example methanol and ethanol; and especially nitriles, for example acetonitrile and propionitrile; as well as with dimethyl formamide; and the like.

The reaction temperature can be varied within a fairly wide range. In general, the reaction is carried out at substantially between about 30–70° C.

The starting materials, as well as any auxiliary materials (e.g. the acid-binding agent) are, in general, used in equimolar amounts.

After combining the starting components, it is advantageous to continue stirring the mixture (for example for 3 to 7 hours) until the reaction is complete. The products may then be obtained in good yield and with great purity.

The thionophosphonic acid esters of Formula I above which can be prepared according to the present invention are obtained in most cases in the form of colorless to yellow-colored, water-insoluble oils which, by so-called "slight distillation," that is longer heating to moderately elevated temperatures under reduced pressure, can be freed from substantially all volatile components and can in this way be obtained in crystalline form. The crystallized compounds can readily be further purified by recrystallization from the usual solvents. Their structure is shown by IR and NMR spectra.

As already mentioned above, the instant new active compounds are distinguished by outstanding insecticidal and acaricidal effectiveness. The effect sets in rapidly and is long-lasting. The instant compounds have at the same time only a slight phytotoxicity. For this reason, such compounds can be used with success in plant protection for the control of noxious sucking and eating insects and Diptera, and against mites (Acarina).

To the sucking insects contemplated herein there belong, in the main, aphids (Aphidae) such as the green peach aphid (*Myzus periscae*), the bean aphid (*Doralis fabae*), the bird cherry aphid (*Rhopalosiphum padi*), the pea aphid (*Macrosiphum pisi*), and the potato aphid (*Macrosiphum solanifolii*), the current gall aphid (*Cryptomyzus korschelti*), the mealy apply aphid (*Sappaphis mali*), the mealy plum aphid (*Hyaloterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (Lepidoptera) such as the diamond-back moth (*Plutella maculipennis*), the gipsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia Kuhniella*) and greater wax moth (*Galleria mellonella*); and the like. Also to be classed with the biting insects are beetles (Coleoptera), for example the granary weevil (*Sitophilus granarius Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the sawtoothed grain beetle (*Oryzaephilus surinamensis*), but also species living in the soil, for example wireworms (Agriotes spec.) and larvae of the cockchafer (*Melolontha melolontha*); cockroaches, such as the German cockroach (*Blattella germanica*), American cockroach (*Perimplaneto americana*), Madeira cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Gryllus domesticus*); termites such as the eastern subterranean termite, (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis captitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calicitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius Tetranychus althaeae* or *Tetranychus urticae*) and the European red mite (*Paratetranychus pilosus Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

The active compounds according to the instant invention can be utilized, if desired, in the form of the usual formulations or compositions with conventional inert pesticidal diluents or extenders, i.e. conventional pesticidal dispersible carrier vehicles such as solutions, emulsions, suspensions, emulsifiable concentrates, spray powders, pastes, soluble powders, dusting agent, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignine, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides, rodenticides, plant growth-inhibiting agents, or fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generaly contemplate those in which the active compound is present in an amount substantially between about 0.00001–20%, preferably 0.01–5%, by weight of the mixture. Thus, the present invention contemplates over-all compositions which comprise mixtures of a conventional dispersable carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

In particular, the present invention contemplates methods of selectively killing, combating or controlling pests, e.g. arthropods, i.e. insects and acarids, as well as rodents (and even growth inhibition of plants at higher concentrations), and more particularly, methods of combating at least one of insects and acarids which comprises applying to at least one of correspondingly (a) such insects, (b) such acarids, and (c) the corresponding habitat, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention is illustrated without limitation by the following examples:

EXAMPLE 1

Bombyx test

Solvent: 3 parts by weight acetone
Emulsifier: 1 part by weight alkylaryl polyglycol ether.

To produce a suitable preparation of the particular active compound, 1 part by weight of such active compound is mixed with the stated amount of solvent which contains the stated amount of emulsifier, and the resulting concentrate is diluted with water to the desired final concentration.

Mulberry leaves (Morus alba) are sprayed with the preparation of the given active compound until dew-moist and are then infested with caterpillars of the silk moth.

After the specified period of time, the degree of destruction is determined as a percentage. 100% means that all the caterpillars are killed, whereas 0% means that no caterpillars are killed.

The particular active compounds tested, their concentrations, the evaluation time and the results obtained can be seen from the following Table 1.

TABLE 1.—BOMBYX TEST

| Active compound (constitution) | Concentration of active compound in percent | Degree of destruction in percent after 3 days |
| --- | --- | --- |
| (A) $(CH_3O)_2\overset{S}{\underset{\|}{P}}-O-C\begin{smallmatrix}CH=CH\\ \\N---N\\H\end{smallmatrix}C=O$ (known) | 0.1 | 0 |
| (1₁) $\begin{smallmatrix}C_2H_5\\ \\C_2H_5O\end{smallmatrix}\!\!\overset{S}{\underset{\|}{P}}-O-C\begin{smallmatrix}CH=CH\\ \\N---N\\H\end{smallmatrix}C=O$ | 0.1<br>0.01<br>0.001 | 100<br>88<br>40 |
| (2₁) $C_6H_5-\overset{S}{\underset{C_2H_5O}{P}}-O-C\begin{smallmatrix}CH=CH\\ \\N---N\\H\end{smallmatrix}C=O$ | 0.1 | 100 |

EXAMPLE 2

Plutella test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Cabbage leaves (Brassica oleracea) are sprayed with the preparation of the given active compound until dew moist and are then infested with caterpillars of the diamond-backmoth (Plutella maculipennis).

After the specified period of time, the degree of destruction is determined as a percentage: 100% means that all the caterpillars are killed, whereas 0% means that none of the caterpillars are killed.

The particular active compounds tested, their concentrations, the evaluation time and the results obtained can be seen from the following Table 2.

TABLE 2.—PLUTELLA TEST

| Active compound (constitution) | Concentration of active compound in percent | Degree of destruction in percent after 3 days |
|---|---|---|
| (A) (CH₃O)₂P(S)—O—C(CH=CH)(N—NH)C=O (known) | 0.1 / 0.02 | 60 / 0 |
| (3₁) CH₃(C₂H₅O)P(S)—O—C(CH=CH)(N—NH)C=O | 0.1 / 0.02 / 0.004 | 100 / 100 / 50 |
| (1₂) C₂H₅(C₂H₅O)P(S)—O—C(CH=CH)(N—NH)C=O | 0.1 / 0.02 / 0.004 / 0.0008 | 100 / 100 / 100 / 80 |

EXAMPLE 3

Piesma test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent which contains the stated amount of emulsifier, and the resulting concentrate is diluted with water to the desired final concentration.

Beet leaves are sprayed with the preparation of the given active compound until dew-moist and are then infested with beet bugs (*Piesma quadrata*).

After the specified period of time, the degree of destruction is determined as a percentage. 100% means that all the caterpillars are killed, whereas 0% means that no caterpillars are killed.

The particular active compounds tested, their concentrations, the evaluation time and the results obtained can be seen from the following Table 3.

TABLE 3.—PIESMA TEST

| Active compound (constitution) | Concentration of active compound in percent | Degree of destruction in percent after 3 days |
|---|---|---|
| (A) (CH₃O)₂P(S)—O—C(CH=CH)(N—NH)C=O (known) | 0.1 / 0.02 | 20 / 0 |
| (3₂) CH₃(C₂H₅O)P(S)—O—C(CH=CH)(N—NH)C=O | 0.1 / 0.02 / 0.004 | 100 / 100 / 90 |
| (1₃) C₂H₅(C₂H₅O)P(S)—O—C(CH=CH)(N—NH)C=O | 0.1 / 0.02 / 0.004 | 100 / 100 / 100 |

EXAMPLE 4

Tetranychus test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus telarius*) in all stages of development.

After the specified period of time, the effectiveness of the preparation of the given active compound is determined by counting the dead mites. The degree of destruction thus obtained is expressed as a percentage: 100% means that all the spider mites are killed, whereas 0% means that none of the spider mites are killed.

The particular active compounds tested, their concentrations, the evaluation time and the results obtained can be seen from the following Table 4.

TABLE 4.—BOMBYX TEST

| Active compound (constitution) | Concentration of active compound in percent | Degree of destruction in percent after 48 hours |
|---|---|---|
| (A) (CH₃O)₂P(S)—O—C(CH=CH)(N—NH)C=O (known) | 0.1 | 0 |
| (3₃) CH₃(C₂H₅O)P(S)—O—C(CH=CH)(N—NH)C=O | 0.1 | 95 |
| (1₄) C₂H₅(C₂H₅O)P(S)—O—C(CH=CH)(N—NH)C=O | 0.1 | 95 |

The following further examples are set forth to illustrate, without limitation, the process for producing the particular new compounds according to the present invention.

EXAMPLE 5

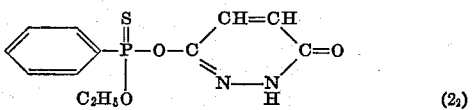

(2₁)

33 g. (0.3 mol) maleic acid hydrazide are dissolved in 150 ml. acetonitrile, and 30 g. (0.3 mol) triethylamine are added to this solution. The mixture is heated to 40° C. for half an hour. 67 g. (0.3 mol) phenyl-thionopphosphonic acid O-ethyl ester chloride are then added dropwise to the reaction mixture at this temperature. The reaction proceeds strongly exothermally. The reaction mixture is stirred at 40° C. for a further 3 hours and thereafter for several hours at room temperature. The triethylammonium hydrochloride is then filtered off with suction, the filtrate is taken up in chloroform, and the chloroform solution is washed with water. Finally, after drying of the organic phase, the solvent is drawn off and the reaction product is slightly distilled: it crystallizes in most cases. The yield is 42 g. (47% of the theory) of phenyl-O-ethyl-O-(1,2-pyridazin-6-on-3-yl)thionophosphonic acid ester.

In analogous manner, the following compounds can be prepared:

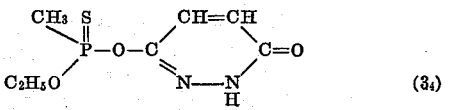

(3₄)

M.P. 75–77° C.

Yield: 53% of the theory of methyl-O-ethyl-O-(1,2-pyridazin-6-on-3-yl)-thionophosphonic acid ester.

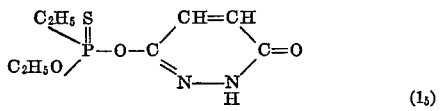

M.P. 62° C.

Yield: 55% of the theory of ethyl-O-ethyl-O-(1,2-pyridazin-6-on-3-yl)-thionophosphonic acid ester.

It will be realized that all of the foregoing compounds contemplated by the present invention possess the desired selective pesticidal, especially arthropodicidal, i.e. insecticidal or acaricidal, properties for combating insects and acarids, and that such compounds have not only a very slight toxicity toward warm-blooded creatures, but also a concomitantly low phytotoxicity.

As may be used herein, the terms "arthropod," "arthropodicidal" and "arthtropodicide" contemplate specifically both insects and acarids. Thus, the insects and acarids may be considered herein collectively as arthropods to be combated in accordance with the invention, and accordingly the insecticidal and/or acaricidal activity may be termed arthopodicidal activity, and the concomitant combative or effective amount used will be an athropodicidally effective amount which in effect means an insecticidally or acaricidally effective amount of the active compound for the desired purposes.

It will be appreciated that the instant specification and examples are set forth by way of illustration.

What is claimed is:

1. A thionophosphonic acid ester of the formula

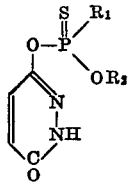

in which $R_1$ is selected from the group consisitng of alkyl of 1–6 carbon atoms and phenyl, and $R_2$ is alkyl of 1–6 carbon atoms.

2. An ester according to claim 1 wherein $R_1$ is selected from the group consisting of $C_{1-4}$ alkyl and phenyl, and $R_2$ is $C_{1-4}$ alkyl.

3. An ester according to claim 1 wherein $R_1$ is $C_{1-4}$ alkyl and $R_2$ is $C_{1-4}$ alkyl.

4. An ester according to claim 1 wherein $R_1$ is phenyl and $R_2$ is $C_{1-4}$ alkyl.

5. An ester according to claim 1 wherein $R_1$ is $C_{1-2}$ alkyl and $R_2$ is $C_{1-2}$ alkyl.

6. An ester according to claim 1 wherein $R_1$ is phenyl and $R_2$ is $C_{1-2}$ alkyl.

7. An ester according to claim 1 wherein such compound is ethyl-O-ethyl-O-(1,2 - pyridazin - 6-on-3-yl)-thionophosphonic acid ester of the formula

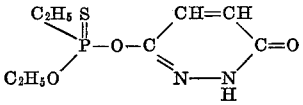

8. An ester according to claim 1 wherein such compound is phenyl-O-ethyl-O-(1,2-pyridazin - 6-on - 3yl)-thionophosphonic acid ester of the formula

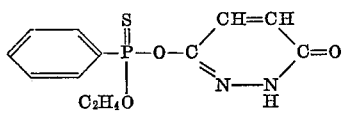

9. An ester according to claim 1 wherein such compound is methyl-O-ethyl-O-(1,2-pyridazin - 6 - on-3-yl)-thionophosphonic acid ester of the formula

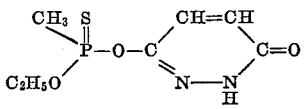

References Cited

UNITED STATES PATENTS 3,155,662  11/1964  Stormann-Menninger et al. 260—250A
2,759,937   8/1956  Du Breuil _____ 260—250A
3,100,206   8/1963  Rigterink _____ 260—250A

FOREIGN PATENTS 1,081,249   8/1967  Great Britain _____ 260—250

NICHOLAS S. RIZZO, Primary Examiner

U.S. Cl. X.R.

424—250

UNITED STATES PATENT OFFICE
CERTIFICATE OF CORRECTION

PO-1050
(5/69)

Patent No. 3544572      Dated December 1, 1970

Inventor(s) Christa Fest and Ingeborg Hammann

It is certified that error appears in the above-identified patent and that said Letters Patent are hereby corrected as shown below:

Col. 5, line 23, "generaly" should be -- generally --

Col. 6, Table 1, last column, 3rd figure from top "88" should be -- 80 --

Col. 10, claim 8, line 23, the structural formula should read -- $C_2H_5O$ --

Col. 9, line 30, after "illustration" insert

"and not limitation, and that various modifications and changes may be made without departing from the spirit and scope of the present invention".

Signed and sealed this 27th day of April 1971.

(SEAL)
Attest:

EDWARD M. FLETCHER, JR.
Attesting Officer.

WILLIAM E. SCHUYLER, Jr
Commissioner of Patents